US012785415B2

(12) United States Patent
Hess

(10) Patent No.: US 12,785,415 B2
(45) Date of Patent: Nov. 3, 2026

(54) MOBILE POWER SUPPLY UNIT FOR A MOBILE WORK-PERFORMING MACHINE

(71) Applicant: Liebherr-Hydraulikbagger GmbH, Kirchdorf (DE)

(72) Inventor: Christoph Hess, Hergensweiler (DE)

(73) Assignee: LIEBHERR-HYDRAULIKBAGGER GMBH, Kirchdorf (DE)

( * ) Notice: Subject to any disclaimer, the term of this patent is extended or adjusted under 35 U.S.C. 154(b) by 0 days.

(21) Appl. No.: 19/057,575

(22) Filed: Feb. 19, 2025

(65) Prior Publication Data

US 2025/0273979 A1 Aug. 28, 2025

(30) Foreign Application Priority Data

Feb. 23, 2024 (DE) ..................... 10 2024 105 117.5

(51) Int. Cl.
*H02J 7/14* (2006.01)

(52) U.S. Cl.
CPC .................................. *H02J 7/1415* (2013.01)

(58) Field of Classification Search
CPC ....... H02J 7/1415; H02J 7/0042; B60L 1/003; B60L 50/53; B60L 53/14; B60L 53/31; B60L 53/53; B60L 53/57; B60L 2200/36; B60L 2200/40
See application file for complete search history.

(56) References Cited

U.S. PATENT DOCUMENTS

| | | | | |
|---|---|---|---|---|
| 8,084,993 | B1 * | 12/2011 | Wong | B62B 3/04 320/109 |
| 9,103,495 | B2 * | 8/2015 | Intravatola | F16M 11/28 |
| 9,290,100 | B2 | 3/2016 | Wisniewski et al. | |
| 10,292,300 | B2 * | 5/2019 | Inoue | H05K 7/183 |
| 10,833,379 | B2 * | 11/2020 | Scaringe | H01M 10/63 |
| 11,189,999 | B2 * | 11/2021 | Maier | G02B 6/501 |
| 11,339,034 | B2 * | 5/2022 | Sikora | B66D 3/18 |
| 12,017,547 | B2 * | 6/2024 | Kazyak | B60L 1/00 |
| 12,227,242 | B2 * | 2/2025 | Woods | B62D 63/064 |
| 12,459,789 | B2 * | 11/2025 | Sikora | B66C 13/085 |

(Continued)

FOREIGN PATENT DOCUMENTS

| | | | | |
|---|---|---|---|---|
| DE | 102014100957 A1 * | 8/2014 | | H01M 50/249 |
| DE | 102013110464 A1 | 3/2015 | | |

(Continued)

*Primary Examiner* — Pedro J Cuevas
(74) *Attorney, Agent, or Firm* — McCoy Russell LLP

(57) ABSTRACT

The disclosure relates to a mobile power supply unit for an electrically operable, mobile work-performing machine, comprising a power source surrounded by a housing and a first electrical connection, via which the work-performing machine is electrically connectable to the power source and can be supplied with electrical energy by the latter. In accordance with the disclosure the housing has a pick-up element, which is configured and arranged so that the power supply unit can be gripped and moved by means of a gripping tool and/or a quick-coupling device of the work-performing machine. The disclosure further relates to a set comprising a power supply unit according to the disclosure, to a work-performing machine comprising a power supply unit according to the disclosure, and to a method for moving such a power supply unit.

17 Claims, 3 Drawing Sheets

(56) References Cited

U.S. PATENT DOCUMENTS

2012/0168576 A1* 7/2012 Intravatola .............. F21V 21/06 248/125.8
2014/0205404 A1* 7/2014 Bryant ...................... B60P 1/28 414/812
2014/0217991 A1* 8/2014 Wisniewski ............ B60L 50/64 320/137
2014/0219752 A1* 8/2014 Chamberlain ............ B60P 1/54 414/800
2014/0219754 A1* 8/2014 Timonen ............... B60P 1/6436 414/813
2014/0219757 A1* 8/2014 Wisniewski .......... B60P 1/6418 414/812
2014/0292260 A1* 10/2014 Dyer ....................... B60L 53/65 320/137
2014/0375272 A1* 12/2014 Johnsen .................. B60L 58/19 320/136
2018/0295740 A1* 10/2018 Inoue ................... H05K 7/1488
2020/0052476 A1* 2/2020 Maier .................... H02G 11/02
2022/0017335 A1* 1/2022 Sikora ..................... B66C 13/08
2022/0274809 A1* 9/2022 Sikora ................... B66C 13/085
2023/0174300 A1* 6/2023 Flynn ...................... B60L 58/14
2023/0264766 A1* 8/2023 Woods ................... B62D 33/02 180/68.5
2025/0183812 A1* 6/2025 Friedrich ............ H01M 10/425
2025/0289689 A1* 9/2025 Bell ........................ B66C 23/38
2025/0303884 A1* 10/2025 Kumar .................... B60L 53/66
2025/0348057 A1* 11/2025 Shimizu .................. B25B 21/02

FOREIGN PATENT DOCUMENTS

DE 202020100673 U1 * 2/2020 .............. H02J 9/062
DE 102019204991 A1 10/2020
EP 4607749 A1 * 8/2025 .............. B60L 53/31
JP 2024005435 A 1/2024
WO 2023100089 A1 6/2023
WO 2023217921 A1 11/2023

* cited by examiner

MOBILE POWER SUPPLY UNIT FOR A MOBILE WORK-PERFORMING MACHINE

CROSS REFERENCE TO RELATED APPLICATION

The present application claims priority to German Patent Application No. 10 2024 105 117.5 filed on Feb. 23, 2024. The entire contents of the above-listed application are hereby incorporated by reference for all purposes.

TECHNICAL FIELD

The present disclosure relates to a mobile power supply unit, a set and a mobile work-performing machine comprising such a unit, as well as a method for moving the power supply unit.

BACKGROUND

In recent years, there has been an increasing trend towards the electrification of work-performing machines in order to reduce $CO_2$ emissions and increase energy security. Mobile machines can carry their own power source (e.g. a battery or battery pack, an internal combustion engine-generator combination or a fuel cell) to supply the electric drives with power. However, the required installation space must be made available in the work-performing machine for this, which increases the dimensions of the work-performing machine as well as its weight.

SUMMARY

Alternatively, mobile work-performing machines can be supplied via a stationary, external power source, wherein correspondingly long and flexible power supply lines must be provided. However, such a solution may restrict the work-performing machine's freedom of movement in working mode. In addition, stationary power supply systems have a limited range, which means that when the machine is moved to a different location (e.g. to a night store or a workshop), it must be supplied temporarily via a different power source, e.g. an installed internal combustion engine or a power supply device temporarily attached to the machine. In addition, with a stationary power supply, it is often not possible to change location quickly, e.g. to leave a danger zone in an emergency.

The present disclosure therefore addresses the problem of avoiding these disadvantages and increasing the operating range and flexibility of a mobile work-performing machine that can be operated electrically via a stationary power supply.

According to the disclosure, this problem is solved by a device, and a work-performing machine, as described herein.

Accordingly, a mobile power supply unit is proposed for an electrically operable, mobile work-performing machine, which comprises a housing, a power source surrounded by the housing and a first electrical connection. The work-performing machine can be electrically connected to the power source of the mobile power supply unit via the first electrical connection and can be supplied with electrical energy by the latter. The power source can be completely or partially surrounded by the housing. The housing can be a metal housing.

According to the disclosure, the housing has a pick-up element which is configured and arranged on the housing in such a way that the power supply unit can be gripped and moved by means of a gripping tool of the work-performing machine. In this case, the pick-up element is specially conceived and configured to be gripped and securely held by a gripping tool so that the power supply unit can be lifted, moved and carried along by the work-performing machine.

Alternatively, the pick-up element can be configured according to the disclosure and arranged on the housing in such a way that the power supply unit can be gripped and moved by means of a quick-coupling device of the work-performing machine. The quick-coupling device can be a known mechanical quick coupler, via which the work-performing machine can quickly and easily pick up an attachment tool (e.g. in the case of a hydraulic excavator, either a excavator bucket or a grab). In this case, the pick-up element has corresponding pick-up elements that can be picked up via the quick coupler of the work-performing machine as is the case with an attachment tool.

The pick-up element can be formed in one piece on the housing or connected to the housing via connecting means (e.g. screws). The housing can include a base plate and/or feet for placing on the floor.

The mobile power supply unit according to the disclosure can be carried along by the work-performing machine and thus can also supply the work-performing machine with electrical energy during relocation. The housing protects the power source from external influences, while the power supply unit can be parked on the ground during the working mode. The simple attachment of the power supply unit to the pick-up element via the gripping tool means that the power supply unit does not have to be attached to the work-performing machine when it is being moved. If the power supply unit is attached via a quick-coupling device, it can be attached quickly and easily in the usual way. This increases the operating radius of the work-performing machine, as it can also be moved without connection to a stationary power source (e.g. to a different location, a workshop or a "night store").

The work-performing machine can also be connected to an external power source in parallel to the mobile power supply unit in the working mode, wherein this can be disconnected for travel (the power is then only supplied via the mobile power supply unit). Alternatively, an external power source could also be connected to the mobile power supply unit via a corresponding connection and electrically connected to the work-performing machine.

The power supply unit according to the disclosure is preferably not permanently connected to or mounted on the work-performing machine at any time. Preferably, the power supply unit has no connecting elements for fixed (even if only temporary) mounting on a work-performing machine. Instead, the power supply unit is preferably placed on the floor (or on another device) in stationary operation and hangs on a gripping tool of the work-performing machine in mobile operation.

In one possible embodiment, it is provided that the pick-up element is arranged on an upper side of the housing and preferably forms the highest point of the power supply unit. This allows the pick-up element to be easily picked up by a gripping tool or a quick-coupling device without the risk of damaging the rest of the housing.

In a further possible embodiment, it is provided that the pick-up element comprises a first portion and a second portion (holding portion). The first portion can be cylindrical in shape, wherein other shapes (e.g. rectangular cross-section) are also conceivable. The second portion is located at an end of the pick-up element facing away from the housing and is wider than the first portion. This allows a gripper to grip the pick-up element below the holding portion in the region of the first portion, wherein the wider holding portion prevents the pick-up element from slipping out of the grip of the gripping tool. The first portion can be directly adjacent to the housing and may be formed in one piece with it. The first and second portions can merge into one another in one piece or be connected to one another via connecting means. The pick-up element can have an overall mushroom-shaped form.

In a further possible embodiment, it is provided that the power supply unit comprises a second electrical connection that is electrically connectable to an external power source. The power supply of the work-performing machine from the external power source (e.g. a construction site grid) in stationary operation is therefore provided via the mobile power supply unit. The latter also comprises a changeover device, which is electrically connected to the first and second electrical connections and to the power source of the power supply unit and is configured to electrically connect the first and second electrical connections to one another in stationary operation, so that the work-performing machine can be supplied via the external power source. In mobile operation, the power source of the power supply unit is electrically connected to the first electrical connection so that the work-performing machine is supplied with power via the power source of the power supply unit. The changeover device thus represents a type of switch for switching between a power supply via an external power source or via the internal power source of the power supply unit.

The changeover device can be integrated into the housing. Alternatively, the changeover device can be attached to the outside of the housing. The second electrical connection can be located on the changeover device or elsewhere on the power supply unit. The first and second connections can both be arranged on the changeover device or at different locations on the housing.

The first and/or second connection may be an electrical connector. In addition to transmitting electrical energy, the first and/or second connection can also comprise at least one signal connection for transmitting electrical signals (e.g. for switching the changeover device).

In a further possible embodiment, it is provided that the changeover device can be switched manually, for example via a switching element arranged on the outside of the housing. Alternatively or additionally, the changeover device can be switched wirelessly, for example by remote control and/or from a driver's cab of the work-performing machine. Alternatively or additionally, the changeover device can be switchable via a signalling line, for example by actuating a corresponding switching element in a driver's cab of the work-performing machine. The at least one signalling line can be connectable to a control system of the work-performing machine via the first electrical connection.

In a further possible embodiment, it is provided that the power supply unit comprises a bracing device that is mechanically connectable to the work-performing machine in order to limit a relative movement between the power supply unit and the work-performing machine and, in particular, to securely clamp the lifted power supply unit when the work-performing machine moves. The bracing device can be connected to a supporting structure of the work-performing machine, for example an undercarriage, a superstructure or a support device. The work-performing machine can have several attachment points for the bracing device at different locations, for example to enable a mechanical connection for different superstructure rotational positions.

The bracing device preferably comprises a bracing element, which is connected to the housing of the power supply unit and which can be or can comprise, for example, a chain, a cable or a strap (or a combination thereof). The bracing element preferably has a mechanical connection element to establish the connection with the work-performing machine (for example a carabiner or a bolt element).

When the power supply unit is lifted and moved, it can be braced against the work-performing machine or against the supporting structure of the work-performing machine by moving the power supply unit away from the supporting structure so that the bracing element is tensioned. This prevents uncontrolled swaying of the lifted power supply unit when the work-performing machine is moved (e.g. when moving to another location).

In a further possible embodiment, it is provided that the power supply unit comprises a flexible power supply line which is electrically connected to the power source and has the first electrical connection. In the simplest case, the flexible power supply line can be a cable, but it can also be a flexible power supply sleeve or chain containing several cables, for example. The power supply unit can comprise a winding device, which is preferably arranged on the outside of the housing and on which the power supply line can be wound and unwound in order to adapt the length of the exposed power supply line to the distance between the power supply unit and the work-performing machine. The winding device can comprise a passively or actively rotatable cable drum.

The aforementioned bracing device and/or power supply line can be permanently connected to the work-performing machine, i.e. also in a stationary working mode.

In another possible embodiment, the power source comprises an internal combustion engine (e.g. a diesel engine) with a downstream generator. A fuel tank can be integrated into the power supply unit or provided externally and connected to the internal combustion engine. Alternatively or additionally, the power source can comprise an energy storage device, for example in the form of a battery or a rechargeable battery (or a battery or rechargeable battery pack). The energy storage device can preferably be charged via an external power source (for example in stationary operation, in which the external power source supplies the work-performing machine with power). Alternatively or additionally, the power source may comprise a fuel cell (or a stack). A pressurised tank (e.g. for hydrogen or methane) can be integrated into the power supply unit or provided externally and connected to the fuel cell.

In a further possible embodiment, the power supply unit has a modular structure and the power source comprises one or more power supply modules that can be reversibly connected to the housing and/or to each other. As a result, the capacity and/or configuration of the power source of the power supply unit can be flexibly adapted to the desired requirements or to the work-performing machine to be supplied without having to provide several separate power supply units. Instead, several power supply modules can be provided and combined as required to form a desired power source. For example, several energy storage modules could be combined to form a storage device with a desired total capacity. There can also be at least one drive module with an internal combustion engine, at least one fuel cell module, at least one tank module, at least one control module, etc. In order to accommodate the power supply modules, the housing can have receptacles with mechanical connecting elements (e.g. rails). The power supply modules can be inserted and fastened into these.

In a further possible embodiment, it is provided that the pick-up element is detachably connected to the housing. This means that differently shaped pick-up elements can be attached depending on the shape of the gripping tool or the quick-coupling device of the work-performing machine to be supplied without having to provide separate power supply units for different types of tools. Alternatively, the pick-up element can be made up of several parts that can be detachably connected to each other, wherein, for example, a holding part comprising the aforementioned second portion can be removed and replaced with a differently shaped holding part.

The disclosure further relates to a set comprising the power supply unit according to the disclosure. The power supply unit may comprise a modular power source, wherein the set comprises a plurality of power supply modules as described above. Alternatively or additionally, the power supply unit may comprise an exchangeable and/or multi-part pick-up element, wherein the set comprises a plurality of pick-up elements and/or a plurality of holding parts of the pick-up elements as described above.

The disclosure also relates to a mobile work-performing machine with a mobile power supply unit according to the disclosure. The work-performing machine can be any mobile work-performing machine with at least one electric drive and a gripping tool and/or a quick-coupling device, for example a mobile handling machine, a hydraulic excavator or the like. Preferably, the mobile work-performing machine can be operated purely electrically (i.e. both the travelling drive and the drive of the working functions are electric). This does not preclude the work-performing machine from comprising hydraulic actuators (e.g. hydraulic cylinders for moving a boom), which are controlled via electrically driven hydraulic pumps.

The work-performing machine can comprise a mobile undercarriage with a wheeled, tracked or rail-mounted running gear and a superstructure mounted rotatably on the undercarriage. The work-performing machine can comprise a movable boom that carries the gripping tool and/or the quick-coupling device, e.g. a boom comprising several sub-segments that can be moved relative to each other. The work-performing machine can comprise a support device, which can be arranged on an undercarriage, for example.

In one possible embodiment, it is provided that the mobile work-performing machine has at least one electric drive and a third electrical connection. The latter is connectable to the first electrical connection of the power supply unit in order to supply the electrical drive with power. The first and third electrical connections can form a plug connection that is easy to establish and can be secured by means of a locking mechanism if necessary.

The disclosure also relates to a method for moving the mobile power supply unit according to the disclosure by means of the mobile work-performing machine according to the disclosure. The same advantages, properties and possible embodiments arise as described above, so that a repetitive description is largely spared. In the method, the power supply unit is picked up and lifted or moved on the pick-up element via a gripping tool or a quick-coupling device of the work-performing machine. The power supply unit (or its power source) constantly supplies the work-performing machine with electrical energy during lifting and movement, so that it can be moved independently of an external, stationary power supply.

The power supply unit can have a bracing device as described above. This can remain connected to the work-performing machine while the power supply unit is being lifted and moved. Preferably, the power supply unit is moved outwards by a corresponding movement of the gripping tool or the quick-coupling device (e.g. via a corresponding movement of a boom) so that the bracing device is tensioned and the power supply unit, which is suspended from the gripping tool/quick-coupling device on the one hand and connected to the work-performing machine via the bracing device on the other hand, is clamped. This prevents unintentional movements of the power supply unit when the work-performing machine is moved and the power supply unit is secured in the air.

In one possible embodiment, the power supply unit is provided with a changeover device as described above. Before the power supply unit is picked up and moved by the gripping tool or the quick-coupling device, the work-performing machine is supplied in stationary operation via an external power source (e.g. stationary power grid) connected to the power supply unit.

In order to move the power supply unit or the work-performing machine, the changeover device is switched from stationary operation to mobile operation so that the work-performing machine is supplied with power via the internal power source of the power supply unit and no longer via the external power source. Before the movement, the external power source is preferably disconnected from the second electrical connection of the power supply unit.

Once the movement has been completed (e.g. after the work-performing machine has been moved from a first location to a second location with the power supply unit picked up, wherein the same or another external power source is again available at the second location), the changeover device is preferably switched back to stationary operation. To do this, a connection to the external power source is first re-established at the second electrical connection. The internal power source of the power supply unit can now be charged, preferably via the stationary power source.

BRIEF DESCRIPTION OF THE FIGURES

Further features, details and advantages of the disclosure can be found in the exemplary embodiments explained below with reference to the figures, in which.

DETAILED DESCRIPTION

Figure 1:
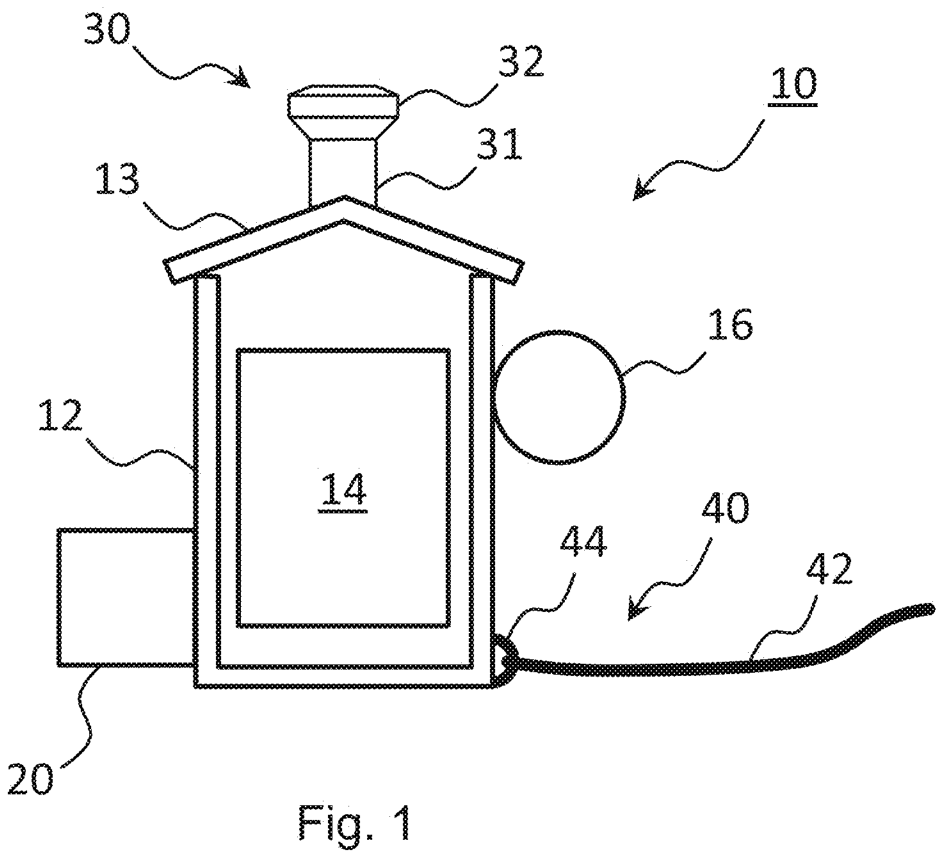
FIG. 1: shows a schematic sectional view of the mobile power supply unit according to a first exemplary embodiment.

FIG. 1 shows a schematic side sectional view of a first exemplary embodiment of the mobile power supply unit 10 according to the disclosure. The power supply unit 10 comprises a housing 12 and a power source 14 arranged inside the housing 12 for generating or providing electrical energy. The power source 14, which is shown only schematically as a box, can comprise, for example, an internal combustion engine and a generator, an electrical energy storage device and/or a fuel cell.

In the exemplary embodiment shown in FIG. 1, the housing 12 comprises an upper part 13, on the upper side of which there is a pick-up element 30. This is configured so that it can be gripped by a gripping tool 8 of a work-performing machine 1 and the entire power supply unit 10 can thus be lifted and moved. The upper part 13 and the rest of the housing 12 can be formed in one piece or can be different and possibly separable parts.

The power supply unit 10 can have a bracing device 40, which comprises a bracing element 42, which can be a chain, for example. This can be attached to the work-performing machine 1, for example to its undercarriage 2 or support device 3 (see FIGS. 3-4).

The power supply unit 10 has a first electrical connection 21 to establish an electrical connection with an electrical supply system of the work-performing machine 1 in order to supply one or more electrical drives of the work-performing machine 1 with power. The work-performing machine 1 has a suitable third electrical connection 23 for this purpose. In the exemplary embodiments shown, the power supply unit 10 comprises a flexible power supply line 24 (not shown in FIG. 1), for example a power cable, at the end of which the first electrical connection 21 (e.g. in the form of a connector or plug) is located. The power supply cable 24 can be wound on a winding device 16, which can be arranged on the side of the housing 12. The power supply cable 24 can be unwound from this winding device 16 in order to establish the electrical connection with the work-performing machine 1.

The power supply unit 10 also has a second electrical connection 22, which is not shown in FIG. 1. An external power source 50, such as a stationary power grid or a stationary construction site generator, can be connected to this, so that the work-performing machine 1 can be supplied with electrical energy via the external power source 50 in a stationary working mode.

In addition, the power supply unit 10 can comprise a changeover device 20, by means of which it is possible to switch between stationary operation and mobile operation, in which the internal power source 14 supplies the work-performing machine 1 with power (e.g. by remote control or from the driver's cab of the work-performing machine 1). The aforementioned second electrical connection 22 can be located on the changeover device 20 (see FIG. 4).

In stationary operation, the mobile power supply unit 10 is parked on the ground, for example, and electrically connected to the work-performing machine 1 via the first connection 21. There is an electrical connection between the first electrical connection 21 and the second electrical connection 22 connected to the external power source 50, bypassing the internal power source 14. In mobile operation, the external power source 50 is disconnected from the mobile power supply unit 10 and the changeover device 20 connects the first electrical connection 21 to the internal power source 14, so that the work-performing machine 1 can pick up the power supply unit 10 at the pick-up element 30, lift it and move it independently. The power is supplied here via the power supply unit 10. The work-performing machine 1 is no longer tied to the limited range of the stationary power supply.

Figure 3:
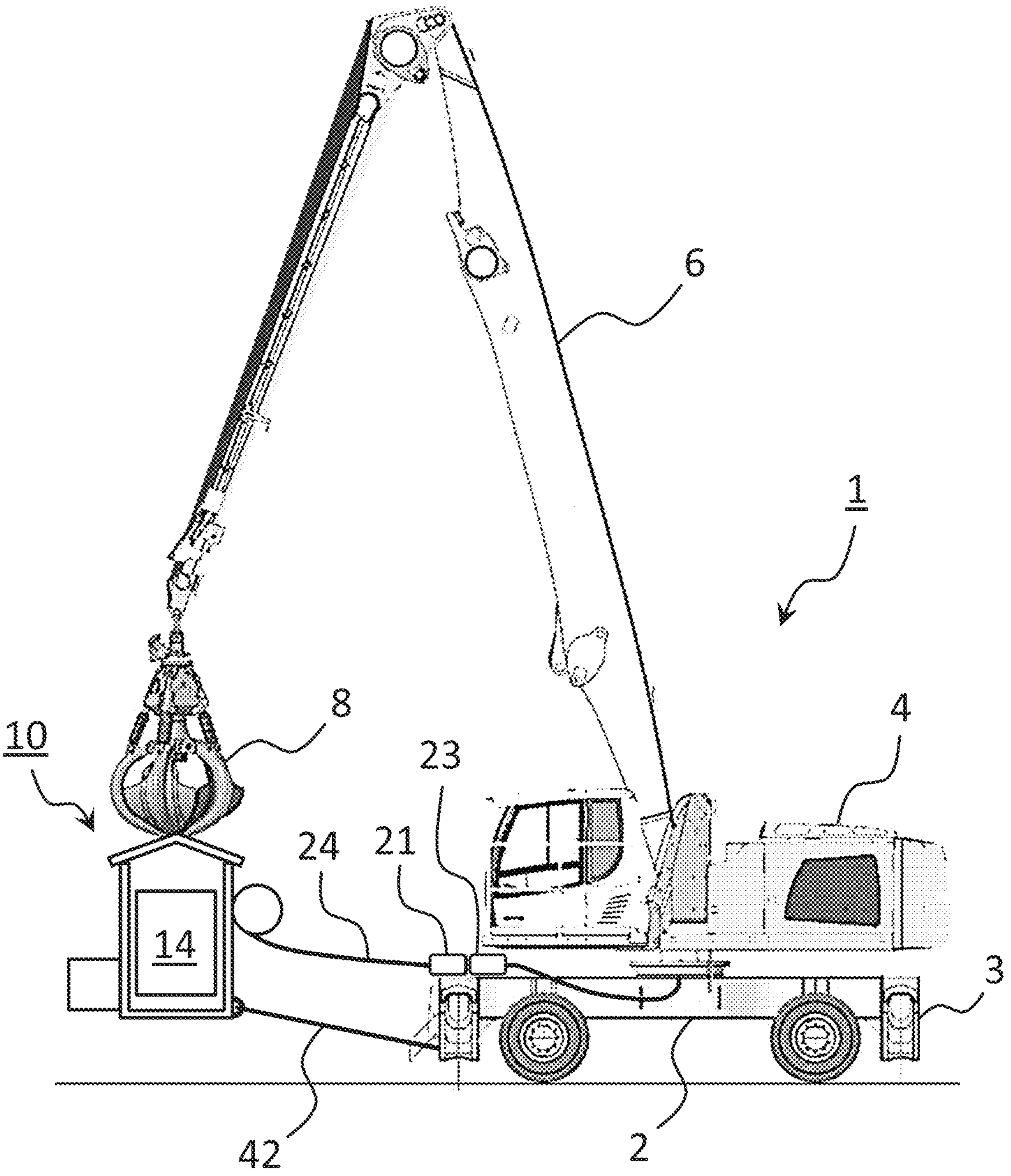
FIG. 3: shows a side view of an exemplary embodiment of the work-performing machine according to the disclosure with the power supply unit lifted.

FIG. 3 shows an exemplary embodiment of the work-performing machine 1 according to the disclosure with a lifted power supply unit 10 according to the embodiment of FIG. 1. In this exemplary embodiment, the work-performing machine 1 is a mobile handling machine 1, wherein the power supply unit 10 according to the disclosure can also be used with any other mobile work-performing machine 1 with gripping tool. The work-performing machine 1 comprises an undercarriage 2 with a wheeled running gear for moving the work-performing machine 1 and a support device 3 with extendable supports for supporting the work-performing machine 1 in a working mode (see FIG. 4). A superstructure 4 with a boom 6 is mounted on the undercarriage 2 so as to be rotatable about a vertical axis of rotation. In the machine 1 shown, the boom 6 is configured as an articulated boom with two boom segments that can be pivoted relative to each other and can be tilted up and down relative to the superstructure 4 by means of a hydraulic cylinder, not shown. A gripping tool 8 is located at the end of the boom 6 and is configured as a clamshell grab in the exemplary embodiment shown.

Figure 2:
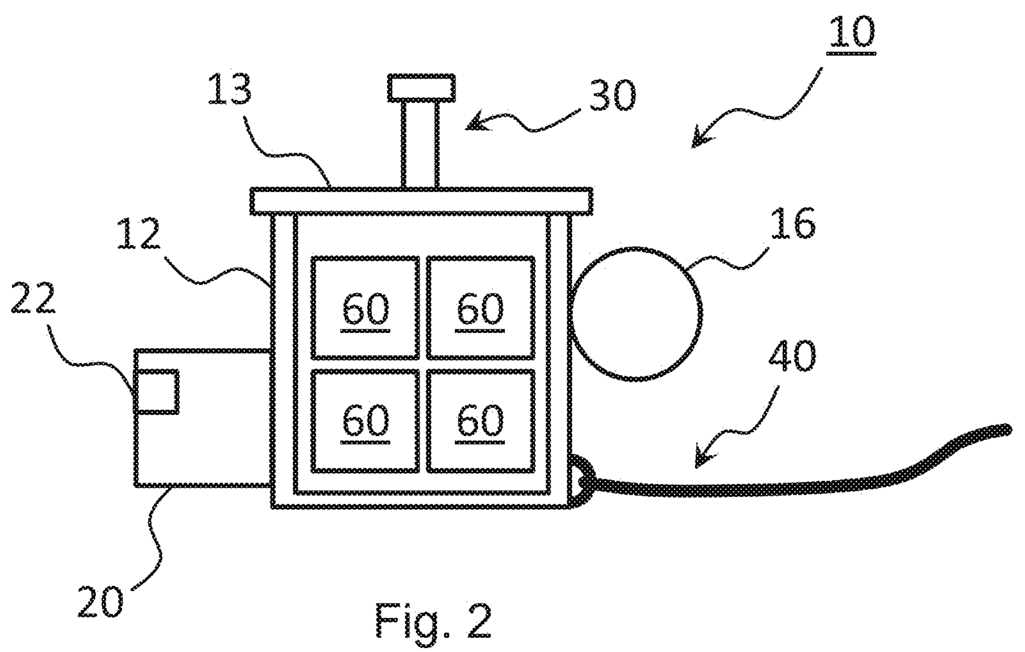
FIG. 2: shows a schematic sectional view of the mobile power supply unit according to a second exemplary embodiment.

In the exemplary embodiment of the power supply unit 10 according to FIG. 1, the pick-up element 30 substantially has a mushroom shape and has a cylindrical first portion 31 and a second portion 32 (=retaining portion) that adjoins it and widens radially outwards. The latter prevents it from slipping out of the gripping tool 8 after its blades have closed around the pick-up element 30 in the region of the first portion 31 (see FIG. 3). FIG. 2 shows a pick-up element 30 with an alternative shape (there, the second portion 32 has a constant width over its height, while the second portion 32 is bevelled at the bottom and top in the exemplary embodiment of FIG. 1).

FIG. 3 shows the mobile operation of the power supply unit 10. This is lifted by the gripping tool 8 and tensioned by the bracing device 40. The bracing element 42 is mechanically connected to the support device 3 and tensioned so that the power supply unit 10 is braced against the undercarriage 2 and cannot move in an uncontrolled manner when the work-performing machine 1 is moved. FIG. 3 schematically shows the third electrical connection 23 of the work-performing machine 1, which provides an electrical connection to the internal vehicle power supply system and thus to the electric drives.

Figure 4:
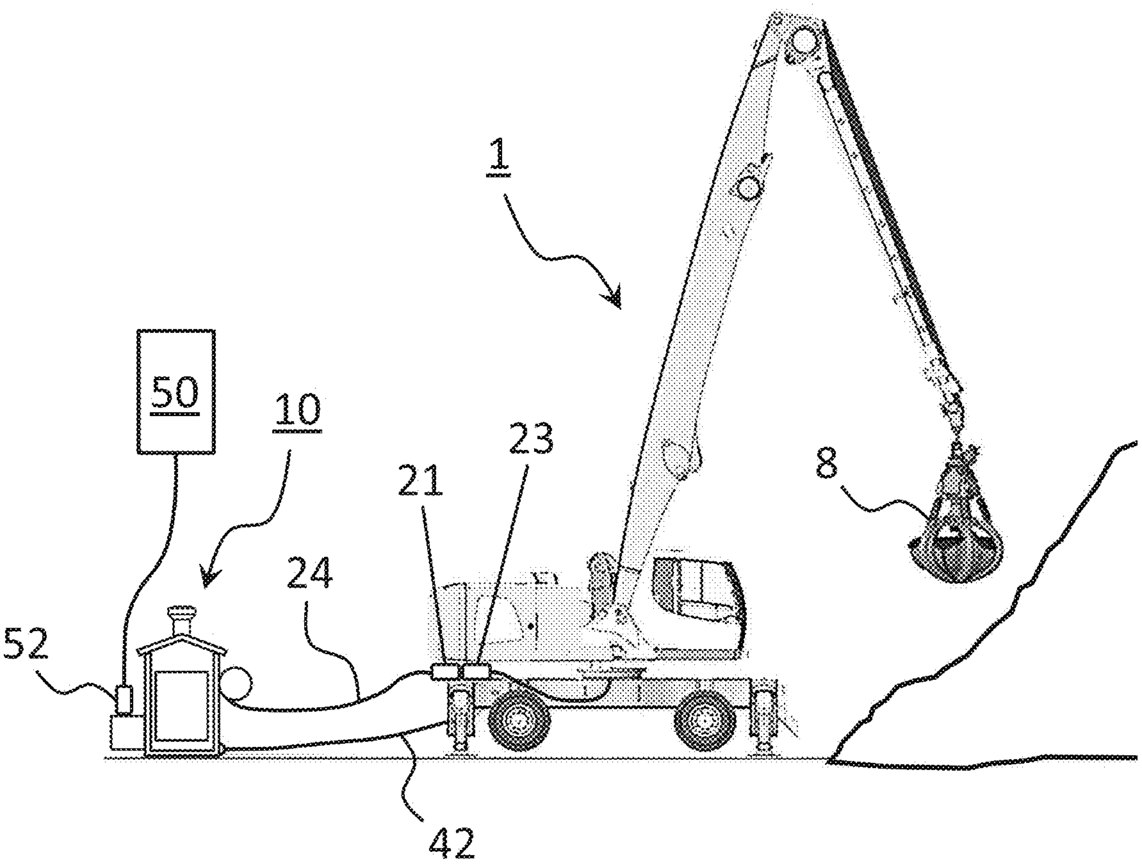
FIG. 4: shows the work-performing machine according to FIG. 3 in stationary working mode with the power supply unit switched off.

FIG. 4 shows the work-performing machine 1 in stationary operation when handling material using the gripper 8. The mobile power supply unit 10 is parked on the ground outside the working area of the work-performing machine 1 and is connected to a power supply line 52 of an external power source 50 via the second electrical connection 22. The changeover device 20 connects the first and second electrical connections 21, 22 while the internal power source 14 is deactivated, so that the work-performing machine 1 is supplied by the external power source 50. The bracing element 42 can also remain connected to the undercarriage 2 during stationary operation.

Another advantage of the mobile power supply unit 10 relates to hazardous situations. If an emergency or hazardous situation occurs during stationary operation, the work-performing machine 1 can be quickly moved out of the danger zone. To do this, the connection to the external power source 50 is disconnected, the changeover device 20 is switched to mobile operation, the power supply unit 10 is gripped and lifted by the gripper 8 via the pick-up element 30 and the boom 6 is moved so that the bracing device 40 is tensioned. The work-performing machine 1 can then be moved out of the danger zone.

As the mobile power supply unit 10 effectively represents an intermediate piece between the work-performing machine 1 and the stationary power supply 50, the work-performing machine 1 itself does not need to be modified. The mobile power supply unit 10 is connected between the second and third electrical connections 22, 23 during stationary operation. It may only be necessary to provide an attachment point for the bracing element 42 on the work-performing machine 1. This results in a large external variance with an easy-to-handle internal variance.

The flexibility of the mobile power supply unit 10 according to the disclosure can be further increased if it has a modular structure. FIG. 2 shows an alternative exemplary embodiment in which the internal power source 14 comprises a plurality of power supply modules 60 which are interconnected. The housing 12 can have corresponding module holders (not shown) with mechanical connection means for holding the modules 60. Such a modular structure allows different capacities (e.g. several energy storage modules 60 connected together) or different requirements (e.g. different current strengths or different types of power generation, for example by means of an internal combustion engine and generator or by means of a fuel cell) to be achieved with the same power supply unit 10.

In the exemplary embodiment in FIG. 2, the housing 12 also has a different structure (flat upper part 13). This possibility is independent of that of a modular structure or a different shape of the pick-up element 30.

FIGS. 1-2 show that the bracing device 40 comprises a fastening means 44 arranged on the housing 12, to which the bracing element 42 is fastened. The fastening means 44 could alternatively be arranged on the upper part 13, on the changeover device 20 or at any other point of the power supply unit 10.

LIST OF REFERENCE SIGNS

1 work-performing machine
2 undercarriage
3 support device
4 superstructure
6 boom
8 gripping tool
mobile power supply unit
12 housing
13 upper part
14 power source
16 winding device
20 changeover device
21 first electrical connection
22 second electrical connection
23 third electrical connection
24 flexible power supply line
30 pick-up element
31 first portion
32 second portion
40 bracing device
42 bracing element
44 fastening means
50 external power source
52 external power supply connection
60 power supply module

The invention claimed is:

1. A mobile power supply unit for an electrically operable, mobile work-performing machine, comprising a power source surrounded by a housing and a first electrical connection, via which the work-performing machine is electrically connectable to the power source and can be supplied with electrical energy by the latter, wherein the housing comprises a pick-up element which is configured and arranged on the housing in such a way that the power supply unit can be gripped and moved by means of a gripping tool or a quick-coupling device of the work-performing machine, and wherein the pick-up element is detachably connected to the housing or is made up of several parts that can be detachably connected to each other.

2. The mobile power supply unit according to claim 1, wherein the pick-up element is arranged on an upper side of the housing.

3. The mobile power supply unit according to claim 2, wherein the pick-up element forms a highest point of the power supply unit.

4. The mobile power supply unit according to claim 1, wherein the pick-up element comprises a first portion and, at an end facing away from the housing, a second portion, which is wider than the first portion.

5. The mobile power supply unit according to claim 4, wherein the first portion is cylindrically shaped.

6. The mobile power supply unit according to claim 1, further comprising a second electrical connection that is electrically connectable to an external power source, and a changeover device, which is electrically connected to the first and second electrical connections and to the power source of the power supply unit and is configured to electrically connect the first and second electrical connections to one another in stationary operation, so that the work-performing machine can be supplied via the external power source, and in mobile operation the power source of the power supply unit is to be electrically connected to the first electrical connection so that the work-performing machine can be supplied via the power source of the power supply unit.

7. The mobile power supply unit according to claim 6, wherein the changeover device can be switched manually, wirelessly or via a signalling line.

8. The mobile power supply unit according to claim 7, wherein the power supply unit has a modular structure and the power source comprises one or more power supply modules that can be reversibly connected to the housing and/or to each other, wherein the housing has receptacles with mechanical connection elements for reversibly receiving power supply modules.

9. The mobile power supply unit according to claim 7, wherein the signalling line is connectable to a control system of the work-performing machine via the first electrical connection.

10. The mobile power supply unit according to claim 1, further comprising a bracing device that is mechanically connectable to the work-performing machine, in order to limit a relative movement between the power supply unit and the work-performing machine.

11. The mobile power supply unit according to claim 10, wherein the bracing device comprises a bracing element connected to the housing, which bracing element comprises a chain, a cable or a strap.

12. The mobile power supply unit according to claim 1, further comprising a flexible power supply line which is electrically connected to the power source and has the first electrical connection, wherein the power supply unit comprises a winding device, on which the power supply line is mounted such that it can be wound and unwound.

13. A set comprising a power supply unit according to claim 1 and at least one further, differently configured pick-up element or removable part of the pick-up element and at least one further power supply module.

14. A mobile work-performing machine, comprising a mobile power supply unit according to claim 1, wherein the work-performing machine is electrically operable and has a gripping tool and/or a quick-coupling device, by means of which the power supply unit can be gripped and moved via the pick-up element.

15. The mobile work-performing machine according to claim 14, comprising at least one electric drive and a third electrical connection, which is connectable to the first electrical connection of the power supply unit in order to supply the electric drive.

16. A method for moving a mobile power supply unit according to claim 1, wherein the work-performing machine grips and lifts the power supply unit at the pick-up element via a gripping tool and/or a quick-coupling device, wherein the power supply unit, during this movement and also in the stationary state during the working mode of the work-performing machine, remains continuously electrically connected to the work-performing machine and mechanically connected via a bracing device.

17. The method according to the claim 16, wherein the work-performing machine is supplied with power via an external power source before the movement of the power supply unit in stationary operation, wherein a changeover device is switched over from stationary operation to mobile operation so that the work-performing machine is supplied with power via the power source of the power supply unit and no longer via the external power source, wherein after movement of the power supply unit the changeover device is switched back to stationary operation.

* * * * *